United States Patent [19]

Feeney

[11] 4,038,346

[45] July 26, 1977

[54] TACKIFIER COMPOSITION AND RUBBER MIXTURE

[75] Inventor: George W Feeney, Akron, Ohio

[73] Assignee: The Goodyear Tire & Rubber Company, Akron, Ohio

[21] Appl. No.: 564,006

[22] Filed: Mar. 31, 1975

[51] Int. Cl.$^2$ .......................... C08F 4/14; C08L 9/00
[52] U.S. Cl. ....................................... 260/887; 260/5; 260/888; 260/892; 526/185; 526/290; 528/500; 528/501
[58] Field of Search ................... 260/5, 892, 887, 888, 260/880 B, 82; 526/185, 290; 528/500, 501

[56] References Cited

U.S. PATENT DOCUMENTS

| | | | |
|---|---|---|---|
| 3,239,478 | 3/1966 | Harlar, Jr. ...................... | 260/880 B |
| 3,577,398 | 5/1971 | Pace et al. ...................... | 260/5 |
| 3,784,530 | 1/1974 | Osborn et al. ................... | 260/5 |
| 3,846,352 | 11/1974 | Bullard et al. .................. | 260/5 |
| 3,853,826 | 12/1974 | St. Cyr .......................... | 260/5 |
| 3,872,064 | 3/1975 | Pace et al. ..................... | 260/5 |

*Primary Examiner*—J. Ziegler
*Attorney, Agent, or Firm*—F. W. Brunner; H. C. Young, Jr.

[57] ABSTRACT

A tackifier composition comprised of a tackifying resin and a selected oily polymer distillation cut as well as an admixture thereof with selected rubbery polymers to achieve an adhesive composition. Said tackifier composition is comprised of both a tackifying resin derived from the polymerization of a mixture of at least one olefin and at least one diolefin as well as an oily polymer distillation cut at a temperature in the range of about 190° C to about 250° C of the product of polymerizing a monomer mixture comprised primarily of piperylene and selected monoolefins with the optional addition of dicyclopentadiene and α-methyl styrene.

9 Claims, No Drawings

TACKIFIER COMPOSITION AND RUBBER MIXTURE

This invention relates to adhesive compositions and to methods for the preparation. While the invention is not restrictive thereto, it has particular reference to pressure sensitive adhesives. It further relates to pressure sensitive tapes.

Various adhesives can advantageously be used as pressure sensitive adhesives, laminate adhesives and hot melt adhesives. Pressure sensitive adhesives and adhesive-coated tapes and the like are well-known. Adhesives can typically be prepared by mixing a rubbery material such as natural rubber or synthetic rubber with a thermoplastic tackifier resin. Pressure sensitive adhesives are generally required not only to provide simple tack but to also have a balance of adhesion and cohesion resulting in a satisfactory shear strength and peel strength in order to be commercially useful.

Various synthetic hydrocarbon-derived thermoplastic tackifying resins are well known for use in pressure sensitive adhesives. For example, satisfactory tackifying resins have been prepared by the polymerization with aluminum chloride of a monomer mixture comprised of piperylene and 2-methyl-2-butene, followed by steam stripping unreacted materials and low molecular weight, oily polymers therefrom. Such tackifiers are conveniently admixed with various rubbery materials.

For many applications, it is desired to increase the tack of such rubber-resin mixtures. However, additional resin many times reduces tack. Apparently, compatability of the resin becomes a paramount factor for enhancing tack in various rubbers. Therefore, apparently at high concentrations, a resin can become somewhat incompatible to the extent that the tack of the rubber/resin mixture actually decreases. Indeed, the resin's tack-imparting ability can be reduced to questionable commercial significance.

Therefore, it is an object of this invention to provide adhesive compositions having satisfactory adhesive properties and to provide a method for their preparation.

In accordance with this invention, it has been found unexpectedly that an adhesive composition is comprised of a mixture of (A) about 40 to about 60 parts by weight of a rubbery polymer selected from cis-1,4-polyisoprene natural rubber, synthetic cis-1,4-polyisoprene, and unvulcanized elastomeric block copolymers having the general configuration A - B - A wherein each A is a nonelastomeric polymer block of styrene having an average molecular weight of 2000 to 100,000 and a glass transition temperature above about 25° C, the total block A content being about 10 to about 50 weight percent of said copolymer and B is an elastomeric polymer block of isoprene having an average molecular weight of about 25,000 to about one million and a glass transition temperature below about 10° C, said copolymer having a tensile strength at 25° C in excess of about 200 pounds per square inch and (B) fifty parts by weight of a tackifying resin composition comprised of about 75 to about 98, preferably about 80 to about 95, weight percent of a resin tackifier containing carbon-to-carbon unsaturation therein and derived from a mixture of at least one olefin and at least one diolefin containing 5 to 10 carbon atoms selected from aliphatic hydrocarbons and alicyclic hydrocarbons and, correspondingly, about 25 to about 2, preferably about 20 to about 5, weight percent of an oily polymer as a distillation cut at a temperature in the range of about 190° C to about 250° C of the product of polymerizing in the presence of a catalyst selected from aluminum chloride and ethyl aluminum dichloride at a temperature in the range of about 0° C to about 50° C a monomer mixture comprised primarily of about 20 to about 80, preferably about 35 to about 65, weight percent piperylene and about 80 to about 20, preferably about 65 to about 35, weight percent of a monoolefin selected from 2-methyl-2-butene, 2-methyl-1-butene, 2-methyl-2-pentene and 2-methyl-1-pentene, preferably 2-methyl-2-butene, and about 0 to about 30 weight percent of a monomer selected from dicyclopentadiene and α-methyl styrene, where the weight ratio of said rubber to said resin tackifier is in the range of about 0.8/1 to about 1.5/1.

In the operation of this invention, although the mechanism is not thoroughly understood, it is believed that the oily polymer apparently acts as a compatability-aid by making the basic tackifying resin more compatible with the rubber itself. Apparently, by enhancing its compatability, its tack-imparting ability is also enhanced without seriously degrading the resin's other desirable properties.

In the unvulcanized elastomeric block copolymer, it is preferred that the styrene polymer block has an average molecular weight of from about 5000 to about 30,000, that the elastomeric butadiene polymer block is a 1,4-addition polymer of isoprene having an average molecular weight of from about 50,000 to about 150,000, and the total block A content is from about 10 to about 50 percent, more preferably from about 12 to about 30 percent by weight of copolymer. The copolymer typically can have an intrinsic viscosity of from about 0.6 to about 1.5 as determinated by 0.5 grams of 50 milliliters of toluene solution at 30° C.

The thermoplastic tackifying resins for use in this invention preferably have a softening point according to ASTM Method E28-58T of from about 50° C to about 150° C and more preferably from about 80° C to about 130° C. They are derived from aliphatic and alicyclic hydrocarbons, preferably aliphatic hydrocarbons, and therefore contain essentially no units derived from aromatic hydrocarbons. In this regard, it is preferred that not more than about 5 percent by weight of the units of the tackifying resin are derived from aromatic hydrocarbons and more preferably it is desired that none of the units are derived from aromatic hydrocarbons. Furthermore, it is preferred that the tackifying resin contains carbon-to-carbon unsaturation therein. Therefore, it is preferred that at least a portion of the hydrocarbons used to prepare the resin have at least two carbon-to-carbon double bonds therein. As an indication of such unsaturation contained in the tackifying resin, it has been found that satisfactory resins have an iodine number according to ASTM Method D1959-61 of from about 40 to about 150.

Various thermoplastic tackifying resins can be used in this invention such as, for example, resins derived by polymerizing unsaturated hydrocarbons obtained from petroleum fractions and processes related thereto. It is usually desired to copolymerize at least one unsaturated hydrocarbon having one double bond (monoolefin) with at least one unsaturated hydrocarbon having more than one double bond (diolefin). Various mole ratios of diolefins to monoolefins can be used such as from about 20:80 to about 80:20. Representative of various diolefins are aliphatic diolefins having from 4 to 10 and preferably from 5 to 6 carbon atoms, particularly the conjugated dienes such as 1,3-butadiene, 2-methyl-1,3-butadiene (isoprene), 2-ethyl-1,3-butadiene and 1,3-pentadiene (piperylene), and aliphatic cyclic diolefins such as cyclopentadiene and dicyclopentadiene. It is usually preferred that at least one of the double bonds is alpha to the first carbon atom. Representative of various monoolefins are aliphatic monoolefins having from 3 to 8, and preferably from 4 to 6, carbon atoms such as propylene, the various butenes, including 2-methyl-2-butene, the pentenes, the hexenes, the heptenes and the octenes, and cyclic aliphatic monoolefins having from 5 to 8 and preferably from 5 to 6 carbon atoms such as cyclopentene, cyclohexene, cycloheptene and cyclooctene.

The resins are generally prepared by polymerizing the unsaturated hydrocarbons in an inert volatile solvent of diluent in the presence of a catalyst such as aluminum chloride and ethyl aluminum dichloride. Boron trifluoride and boron trifluoride etherate can be used if lower softening points are desired. Usually, for convenience, particulate anhydrous aluminum chloride is preferred.

In the preparation of the resins, a wide range of temperatures are suitable for the polymerizations. For example, the polymerizations can normally be carried out in the range of from about $-20°$ C to about 100° C and usually more preferably from about 0° C to about 50° C but above the freezing point of the reaction system and below its boiling point. Certainly, whether the pressure at which the reaction is being conducted should be taken into consideration when determining the optimum temperature. Normally, the polymerization reaction pressures may be atmospheric or above or below atmospheric pressure. Generally, a satisfactory polymerization is conducted at about autogenous pressure developed under the operating conditions used.

Exemplary of a preferred thermoplastic tackifying resin for this invention comprises from about 20 to about 80, preferably about 35 to about 65, units derived from piperylene and correspondingly from about 80 to about 20, preferably about 65 to about 35, units derived from 2-methyl-2-butene. The tackifying resin typically has a softening point of from about 80° C to about 110° C. The preparation of such a resin polymer is more fully described in U.S. Pat. No. 3,577,398. Such a resin polymer can be prepared, for example, by polymerizing a mixture comprising from about 20 to about 75 weight percent of piperylene and from about 80 to about 25 weight percent of 2-methyl-2-butene in the presence of an anhydrous catalyst selected from aluminum chloride, aluminum bromide, stannic chloride and boron trifluoride at a temperature of from about 0° C to about 50° C. It is usually preferred to conduct the polymerization in an inert volatile organic solvent using aluminum chloride having a mesh size of from about 50 to about 200 U.S. Sieve size as the catalyst. The resin polymers can be modified by containing up to about 10, preferably up to about 5, weight percent units derived from piperylene dimers, piperylene trimers, and other unsaturated hydrocarbons containing from 4 to 6 carbon atoms, preferably 5 to 6 carbon atoms. Representative of such other reactive hydrocarbons include 2-methyl-1-butene, 2,3-dimethyl-1-butene, 2-methyl-1-pentene, 2-methyl-2-pentene, cyclopentene, 1,3-cyclopentadiene and isoprene.

The prepared thermoplastic tackifying resin polymer is conveniently recovered by steam distillation to remove volatile unreacted monomers, dimers, trimers, etc, and low molecular weight oily polymers.

Indeed, the oily distillate additive used in this invention can be obtained by (A) polymerizing a monomer mixture comprising in the range of 20 to about 75 weight percent piperylene and correspondingly in the range of about 80 to about 25 weight percent monoolefin, preferably 2-methyl-2-butene, in the presence of aluminum chloride or ethyl aluminum dichloride at a temperature of about 0° C to about 50° C, (B) distilling the product to remove volatiles to a temperature of about 200° C followed by (C) recovering oily distillate polymer by further distilling to a temperature of about 240° C. Preferably the oily polymer recovery step (C) is conducted by heating to a temperature in the range of about 225° C to about 235° C, recovering oily polymer distillate therefrom, followed by steam distillation at a temperature in the range of about 230° C to about 240° C to an oily polymer to water weight ratio in the range of about 1.5/1 to about 2.5/1. Thus, the oily polymer distillate has a preferable boiling point in the range of about 200° C to about 320° C.

The unvulcanized elastomeric block copolymer used in this invention comprises nonelastomeric terminal polymer blocks and internal elastomeric polymer blocks. The characteristics of the internal or middle block, which is elastomeric, might be expressed in ASTM Special Technical Bulletin No. 184 as follows: "A substance that can be stretched at room temperature to at least twice its original length and, after having been stretched and the stress removed, returns with force to approximately its original length in a short time."

The terminal nonelastomeric blocks constitute polymeric blocks which do not meet this definition. Further, the difference between glass transition temperatures of the end blocks and middle blocks should be at least 40° C and preferably at least 100° C.

Typically, the unvulcanized elastomeric copolymers can be prepared by first polymerizing styrene with a lithium based initiator. A suitable lithium based initiator is, for example, lithium metal, alkyl lithium compounds, lithium hydrocarbyls and organo lithium amides. The alkyl lithium compounds are preferred. Particularly preferred alkyl lithium compounds are branched chain, preferably secondary alkyl lithiums. Such alkyl lithium compounds especially include secondary butyl lithium, isobutyl lithium, isoamyl lithium and secondary amyl lithium.

After polymerizing the styrene to an average molecular weight of from about 2000 to about 100,000, and preferably from about 5000 to about 30,000, 1,3-butadiene and additional amounts of styrene are added to the polymerization mixture.

The polymerization then continues to provide an elastomeric middle block butadiene polymer having an average molecular weight of from about 25,000 to about 1,000,000, and more preferably between about 50,000 and about 500,000, followed by a non-elastomeric styrene block polymer.

Typically, the preparation of the elastomeric block copolymer is made by polymerizing the monomers at temperatures in the order of about $-20°$ C to about 100° C, preferably between about 20° C and about 65° C in an inert hydrocarbon solvent such as an alpha olefin or aromatic hydrocarbon. Typically inert hydrocarbon solvents are aliphatic hydrocarbons (including cycloaliphatic) such as cyclohexane and a typical aromatic hydrocarbon is benzene. Usually the amount of initiator should be maintained as low as possible, but may be varied over a relatively wide range such as from about 1 to about 200 parts per million, based on the weight of the monomers present.

In the practice of this invention adhesive compositions can conveniently be prepared by mixing rubber, such as, for example the elastomeric block copolymer, with the tackifying resin and oily polymer in the presence of volatile organic hydrocarbon solvents at various temperatures such as from about 0° C to about 100° C and typically from about 20° to about 60° C but above the freezing point of the mixture and below its boiling point. Various aliphatic and aromatic hydrocarbons can be used. Representative examples of such aromatic hydrocarbons are toluene and benzene and representative examples of aliphatic hydrocarbons are pentene, hexane, heptane and octane. A particularly suitable hydrocarbon solvent is a mixture containing from about 10 to about 90 parts of toluene and correspondingly from about 90 to about 10 parts of hexane. This adhesive mixture is then suitable for bonding substrates such as by simply applying it to the substrate surfaces, then drying it, and contacting the said substrate surfaces with the adhesive mixture therebetween and drying the said adhesive.

The mixture has particular utility as a pressure sensitive adhesive. For example, pressure sensitive tapes can easily be prepared by applying the solution of the adhesive mixture to a flexible substrate and drying the mixture. The adhesive of this invention also has utility as a hot melt pressure sensitive adhesive, particularly when prepared by mixing the elastomeric block copolymer, the hydrocarbon tackifying resin and a minor amount of an oil, particularly a rubber processing type oil, such as a petroleum derived or coal tar derived oil. Particularly suitable is mineral oil. The hot melt adhesive is simply applied by heating the mixture, applying it to a substrate and cooling. After cooling it is surprisingly found that the adhesive has good pressure sensitive properties.

In the preparation of the adhesives of this invention, it is understood that minor amounts of various antioxidants and fillers can be added and mixed therewith in order to further improve its aging characteristics and various physical properties.

The following examples further illustrate the invention and are not intended to be limiting. In these examples the parts and percentages are by weight unless otherwise indicated.

EXAMPLE I

A thermoplastic tackifying resin was prepared by the following method:

To a reactor was charged 200 parts of heptane and 6 parts of anhydrous aluminum chloride at a temperature of about 25° C. While continuously stirring the mixture, 400 parts of a hydrocarbon mixture containing unsaturated hydrocarbons was slowly added to the reactor over a period of about 90 minutes. The temperature of the reaction was thereafter maintained in a range of about 25° C to about 30° C for about 60 minutes. The hydrocarbon mixture had the following composition:

| Component | Percent |
| --- | --- |
| 2-pentene | 5.1 |
| 2-methyl-2-butene | 32.9 |
| isoprene | 3.1 |
| 1,3-pentadiene (piperylene) | 27.5 |

-continued

| Component | Percent |
| --- | --- |
| 2,3-dimethyl-1-butene | 2.1 |
| 4-methyl-2-pentene | 19.4 |
| unsaturated hydrocarbons containing 5 to 6 carbon atoms | 10.5 |
| | 100.6 |

The resulting resin was essentially a piperylene/2-methyl-2-butene backboned copolymer, the 2-pentene, 4-methyl-2-pentene and a major portion of other "unsaturated hydrocarbons containing 5 to 6 carbon atoms" being essentially diluents.

After this polymerization, 25 parts of water, 8 parts of particulate hydrated calcium hydroxide and 8 parts of Attapulgus clay were added to the polymerizate. Agitation was provided to suspend the hydrated calcium hydroxide at about 90° C and continued for about 120 minutes. The mixture was then filtered to remove the insoluble catalyst residue, excess calcium compound and clay. The filtrate was then steam distilled to a pot temperature of about 235° C. The resulting residual molten resin was poured from the reactor onto an aluminum tray and cooled to about 25° C, to form 173 parts of a hard brittle resin having a pale yellow color, and having a softening point, according to ASTM Method E28-58T of 94° C.

EXAMPLE II

A polymerization was conducted according to the method of Example I and the filtrate obtained containing residual hydrocarbons, diluents, and polymerization products.

The filtrate was heated to a pot temperature of about 200° C in a simple distillation apparatus containing less than an equivalent of about 5 theoretical plates. Various hydrocarbons, diluents and apparently some low molecular weight products such as dimers and trimers were removed and identified herein as a first overhead, or distillate. The pot temperature was increased to about 240° C, and the second distillate of oily polymer recovered. The residual material in the pot was then subjected to steam distillation at a temperature in the range of about 230° C to about 240° C to an extent of recovered distillate of oily polymer to water weight ratio in the range of about 1.8/1 to about 2.2/1. The recovered oily polymer distillate had a boiling point ranging from about 200° C to about 320° C.

A resin composition was then prepared by mixing 4 parts by weight of the oily polymer of this Example with 40 parts by weight of the hard, thermoplastic, brittle resin prepared according to the method of Example I having a softening point of about 94° C.

EXAMPLE III

A polystyrene-polyisoprene-polystyrene unvulcanized elastomeric block copolymer was prepared by the following method:

A solution was prepared consisting of 2 grams of styrene in a 20 milliliter solution of benzene. The solution was run through silica gel at about 25° C to remove trace amounts of water and then sparged with dry nitrogen for about 30 seconds to remove trace amounts of air.

To the solution was added 0.2 millimoles of secondary butyl lithium in a 0.3 molar heptane solution. The mixture was allowed to polymerize and set aside for about 16 to 18 hours at about 25° C.

A solution was prepared consisting of 16 grams of isoprene and 2 grams of styrene in 80 milliliters of a benzene solution. The solution was run through silica gel at about 25° C to remove traces of water and sparged with dry nitrogen to remove trace amounts of air.

The mixture of isoprene, styrene and benzene was mixed with the original polymerized styrene mixture to the exclusion of air in a reactor. The reactor was sealed and placed in a heated liquid polymerization bath at about 50° C for about 4 hours until about a 100 percent, completion of the polymerization occurred.

The resulting polymer was coagulated with methyl alcohol containing a very small amount of a phenolic antioxidant and dried. The resulting polymer had an intrinsic viscosity of 1.12 in toluene at 30° C. It contained 18 percent by weight units derived from styrene.

A portion of the polymer was molded in the form of dumbbells at 138° C. The dumbbells had a thickness of 0.6 inches, a width of 0.1 inches at its narrow portion and a length of 0.8 inches. The dumbbells were tested on an Instron tester at 25° with a crosshead separation speed of 2 inches per minute. The tests indicated that the prepared block copolymer had an ultimate tensile strength of about 250 pounds per square inch at an elongation of 1500 percent.

Analysis indicated that the block copolymer had a molecular weight of about 100,000. Thus, assuming that the terminal polystyrene blocks were of equal molecular weight, the block copolymer comprised terminal polystyrene blocks having molecular weights of about 9000 and internal polyisoprene having a molecular weight of about 82,000.

EXAMPLE IV

Mixtures of tackifying resins, of the type prepared according to Example I, oily polymer prepared and recovered according to Example II and a polystyrene-polyisoprene-polystyrene block copolymer, obtained as Kraton 1107 from The Shell Chemical Company, were prepared. The block copolymer was similar to the copolymer prepared according to Example III. It reportedly contained about 14 percent styrene by weight, a glass transition temperature of about −70° C and a tensile strength of about 1200 pounds per square inch with an elongation of about 1300 percent measured at 25° C, and intrinsic viscosity of 1.1 as measured in toluene at 30° C.

The mixtures of tackifying resin, oily polymer and block copolymer were prepared by the following method:

One part of a hindered phenol type of non-staining antioxidant was dissolved in 300 parts of a hydrocarbon solvent at about 25° C. The hydrocarbon solvent was made up of 20 parts of toluene and 80 parts of hexane. This solvent mixture was used to provide an optimum viscosity for sample preparation. To the solvent mixture was added 50 parts of the block copolymer of polystyrene-polyisoprene-polystyrene and various amounts of the tackifying resin and oily polymer. The mixture was agitated by rolling in a container at about 25° C for about 8 to 12 hours.

The mixture was coated onto a polyester film having a 1 mil thickness (obtained as Mylar from The E I du Pont de Nemours & Company) with a doctor blade to provide a 1 mil coating on the polyester film. The coating was allowed to partially dry at about 25° C for about 2 minutes. The polyester film with the coat thereon was then placed in a hot air oven at a temperature of 70° C for about 5 minutes. The sample was removed from the hot air oven and allowed to cool to about 25° C and, for protective purposes, a release paper was placed over the coating. The release paper was a clay coated sheet of paper with a silicone release agent overcoat. The sample was cut into strips one inch wide for testing purposes. The result of Rolling Ball tack, 180° peel strength and shear strength tests both on freshly prepared samples and on samples allowed to age at 70° C for about 7 days are shown in the following table where Sample A is a control without the oily polymer:

TABLE 1

| Ingredients | Sample A | B | C | D |
|---|---|---|---|---|
| Resin (Example I) | 40 | 38 | 36 | 34 |
| Block copolymer (Ex III) | 50 | 50 | 50 | 50 |
| Oily polymer (Example II) | 0 | 2 | 4 | 6 |
| Initial Physical Tests | | | | |
| Rolling Ball Tack (in) | 1½ | ¾ | ½ | ¾ |
| 90° Peel Adhesion (hrs) (at 2 sq/in/300 grams) | 43¾ | 15¼ | 7 | 2½ |
| 180° Peel Adhesion (oz) | 67 | 62 | 62 | 48 |
| Dynamic Shear (psi) (at 2 in/min) | 42 | 44 | 41 | 42 |
| Aged Physical Tests (7 days at 70° C) | | | | |
| Rolling Ball Tack (in) | 2¼ | 1 | ¾ | ½ |
| 180° Peel Adhesion (oz) | 72 | 48 | 45 | 38 |
| Dynamic Shear (psi) | 44 | 45 | 44 | 46 |
| Exposed Film Tack Rating* | | | | |
| Days | | | | |
| 5 | 4 | 3 | 2 | 1 |
| 7 | 4 | 3 | 2 | 1 |
| 18 | N | 2 | 1 | VL |
| 30 | N | N | N | N |

*No 1 is most tack
VL is very little tack
N is no tack

In this example the 180° peel strength tests were obtained according to Method PSTC-1, revised in April of 1966, of the Pressure Sensitive Tape Council. This method is found in the Fifth Edition of "TEST METHODS FOR PRESSURE SENSITIVE TAPES" developed by the Pressure Sensitive Tape Council, 1201 Waukegan Road, Glenview, Illinois. This test measures the average pull value required to peel the adhesive from the substrate at a 180° angle in pounds per one inch width of the test sample. The tack and shear strength was measured in this example according to the methods described as PSTC-6 and PSTC-7, respectively, of the Pressure Sensitive Tape Council. In particular, the tack is the measure of distance a ball rolls across the sample and the shear is measured by applying a 1000 gram weight to the sample and measuring the time required for the tape to separate from the substrate.

As indicated, the adhesive composition of this specification can be suitable for preparing a hot melt pressure sensitive adhesive. When it is used as such an adhesive, generally up to about 30 percent by weight and more preferably from about 5 to about 20 percent by weight of an oil, such as a rubber processing oil, can be mixed with the composition. Suitable processing oils are normally derived from petroleum, although they can also be derived from coal tar and other sources such as rosin oils. Representative processing oils are more fully described in U.S. Pat. No. 3,081,276. The processing oils are usually composed primarily of paraffinic hydrocarbons, naphthenic hydrocarbons and aromatic hydrocarbons. Such oils are well known commercial oils normally used in rubber compounding which are generally high-boiling petroleum fractions obtained after gasoline, fuel oil and other lower boiling materials are removed by distillation. They normally have a viscosity of from about 10 centipoises at 100° C up to semi-solid materials softening at about 40° C to about 90° C. They usually have a boiling point of from about 50° C to at least about 200° C and higher. For example, many processing oils have a boiling point of at least about 245° C at 10 millimeters of mercury. They normally have a specific gravity (60/60° F) of from about 0.9 to about 1.05.

As indicated, the adhesive composition has particular utility as a pressure sensitive adhesive. In this regard, commercially useful pressure sensitive tapes are provided comprising the adhesive composition adhered to a flexible substrate. Certainly, various conventional substrates, or backings for such tapes, can be used. Representative examples of such substrates are paper, cloth and various unfibrous films such as cellophane, vinyl resins, polyethylene and the like. In the preparation of pressure sensitive adhesive tapes, the adhesive composition can be applied in various conventional manners such as from a solvent solution or dispersion using the hydrocarbon solvents indicated herein. Typical conventional methods of applying the adhesive composition include the use of a hot melt spreader, calender, reverse roll coater, knife or doctor blade.

In the practice of this invention various amounts of the tackifying resin and oily distillate can be mixed with the rubbery copolymer to provide the adhesive composition, depending somewhat upon its intended use. For example, useful adhesive compositions are prepared by mixing from about 30 to about 250 percent by weight of the tackifying resin with the copolymer. More particularly, in pressure sensitive adhesive applications it is preferred that the tackifying resin comprises from about 30 to about 200 percent by weight of the copolymer, in hot melt adhesive applications it is preferred that the tackifying resin comprises from about 100 to about 250 weight percent of the copolymer and in laminating adhesive compositions it is usually preferred that the tackifying resin comprises from about 60 to about 150 weight percent of the copolymer. In the laminating adhesive applications it is usually desired that the adhesive composition contains at least up to about 10 percent by weight of the hydrocarbon solvents as hereinbefore described.

While certain representative embodiments and details have been shown for the purpose of illustrating the invention, it will be apparent to those having skill in the art that various modifications and changes may be made therein without departing from the spirit or scope of the invention.

What is claimed is:

1. A modified tackifying resin composition prepared by mixing (A) about 75 to about 98 weight percent tackifying resin having a softening point in the range of about 80° C. to about 130° C. with, correspondingly, about 25 to about 2 weight percent oily polymer having a boiling point at atmospheric pressure in the range of about 190° C. to about 250° C.; where said tackifying resin is prepared by the step-wise method of (i) polymerizing at a temperature in the range of about 0° C. to about 50° C. in the presence of a catalyst selected from aluminum chloride and ethylaluminum dichloride, a monomer mixture comprised of (a) about 20 to about 80 weight percent piperylene, (b) about 80 to about 20 weight percent of a monoolefin containing 4 to 6 carbon atoms comprised of at least one olefin selected from the group consisting of 2-methyl-2-butene, 2-methyl-1-butene, 2-methyl-2-pentene and 2-methyl-1-pentene and (c) about 0 to about 30 weight percent of a monomer selected from the group consisting of dicyclopentadiene and α-methylstyrene and (ii) recovering the molten tackifying resin as a distilland from a steam distillation at a pot temperature in the range of about 255° C; and where said oily polymer is prepared by the step-wise method which comprises (iii) polymerizing at a temperature in the range of about 0° C. to about 50° C., in the presence of a catalyst selected from aluminum chloride and ethylaluminum dichloride, a monomer mixture comprised of (a) about 20 to about 80 weight percent piperylene, (b) about 80 to about 20 weight percent of a monoolefin containing 4 to 6 carbon atoms comprised of at least one olefin selected from the group consisting of 2-methyl-2-butene, 2-methyl-1-butene, 2-methyl-2-pentene and 2-methyl-1-pentene and (c) about 0 to about 30 weight percent of a monomer selected from the group consisting of dicyclopentadiene and α-methylstyrene and (iv) recovering said oily polymer as a distillation cut at a temperature in the range of about 190° C. to about 250° C. by distilling, optionally steam distilling, the product of (iii) to remove volatiles to a pot temperature in the range of about 235° C.

2. The composition of claim 1 where said oily distillate polymer mixture is prepared by (1) polymerization, in the presence of a catalyst selected from aluminum chloride and ethyl aluminum dichloride at a temperature in the range of 0° C to about 50° C, a mixture comprised primarily of about 35 to about 65 weight percent piperylene and, correspondingly, about 65 to about 35 weight percent of a monoolefin primarily selected from 2-methyl-2-butene, 2-methyl-1-butene, 2-methyl-2-pentene and 2-methyl-1-pentene, (2) deactivating the catalyst, (3) filtering residues, (4) distilling the filtrate to a temperature in the range of about 110° C to about 150° C to remove unreacted hydrocarbons, diluents, and very low molecular weight polymers therefrom, and (5) recovering the distillation cut of oily polymer mixture at a temperature in the range of about 130° C to about 250° C, optionally with the aid of steam distillation.

3. The composition of claim 2 where said oily distillate polymer has a boiling point in the range of about 130° C to about 320° C and is prepared by (1) polymerization of a monomer mixture comprised of piperylene and primarily 2-methyl-2-butene, (2) deactivating the catalyst with at least one of water and lime, (3) filtering catalyst residues therefrom, (4) distilling the filtrate to a temperature in the range of about 120° C to about 140° C to remove unreacted hydrocarbons, diluents and any various low molecular weight polymers therefrom, (5) recovering the distillation cut of oily polymer mixture at a temperature in the range of about 140° C to about 250° C with the aid of steam distillation.

4. The composition of claim 3 where said tackifying resin is prepared by (1) polymerization in the presence of a catalyst selected from aluminum chloride and ethyl aluminum dichloride at a temperature in the range of about 0° C to about 50° C, a mixture comprised of about 20 to about 80 weight percent piperylene and, corresondingly, to about 80 to about 20 weight percent of a monoolefin primarily selected from 2-methyl-2-butene, 2-methyl-1-butene, 2-methyl-2-pentene and 2-methyl-1-pentene, (2) deactivating the catalyst, (3) filtering residues, and (4) distilling the filtrate to remove unreacted hydrocarbons, diluents, any dimers and trimmers and oily, low molecular weight polymers therefrom to a temperature in the range of about 200° C to about 250° C, optionally with the aid of steam distillation.

5. The composition of claim 4 where said resin tackifier is characterized by having a softening point in the range of about 80° C to about 110° C and is prepared by (1) polymerizing with aluminum chloride a mixture comprising piperylene and, primarily, 2-methyl-2-butene, (2) deactivating the catalyst with at least one material selected from water and lime, (3) filtering catalyst residues therefrom, and (4) distilling unreacted hydrocarbons, diluents and low molecular weight polymers therefrom with the aid of steam distillation.

6. The modified tackifying resin composition of claim 1 in admixture with about 40 to about 60 parts by weight of a rubbery polymer per 50 parts by weight of said tackifying resin/oily polymer mixture, as an adhesive, where said rubbery polymer is selected from cis-1,4-polyisoprene rubber and unvulcanized elastomeric block copolymers having the general configuration A - B - A wherein each A is a nonelastomeric polymer block of styrene having an average molecular weight of about 2000 to about 100,000 and a glass transition temperature above about 25° C., the total block A content being about 10 to about 50 weight percent of said copolymer and B is an elastomeric polymer block of isoprene having an average molecular weight of about 25,000 to about one million and a glass transition temperature below about 10° C., said copolymer having a tensile strength at 25° C. in excess of about 200 pounds per square inch.

7. The composition of claim 6 as a coating on a flexible substrate to provide a pressure sensitive adhesive tape.

8. The composition of claim 6 in admixture with a rubber processing-type oil to provide a hot melt adhesive.

9. The composition of claim 6 where the weight ratio of said rubbery polymer to said tackifying resin is in the range of about 0.8/1 to about 1.5/1, and where said tackifying resin composition is comprised of about 80 to about 95 weight percent of said resin tackifier and, correspondingly, about 20 to about 5 weight percent of said oily polymer distillation cut.

* * * * *